Figures 1, 2:
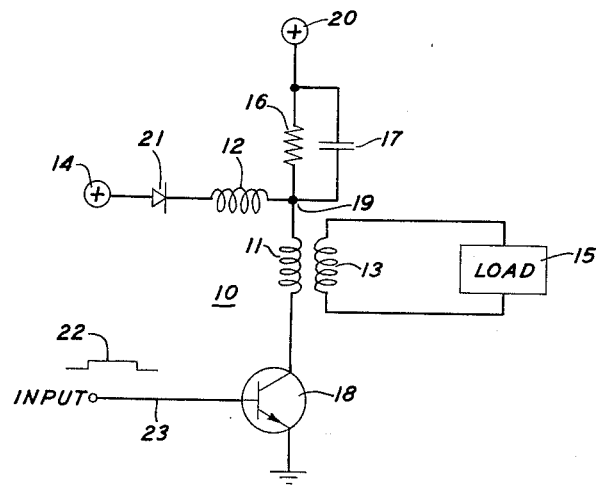

May 14, 1963

G. G. BAILEY 3,089,960

ELECTRICAL DRIVE CIRCUIT

Filed May 2, 1960

| TRANSFORMER WINDINGS | TURNS | TURNS RATIO |
|---|---|---|
| PORTION 11 | N | |
| PORTION 12 | 4N | |
| SECONDARY 13 | 3N | |
| PORTION 11 : SEC. 13 | | 1:3 |
| PORTIONS 11 & 12 : SEC. 13 | | 5:3 |

INVENTOR
G. G. BAILEY

BY James W Falk

ATTORNEY

United States Patent Office 3,089,960
Patented May 14, 1963

3,089,960
ELECTRICAL DRIVE CIRCUIT
George G. Bailey, New Providence, N.J., assignor to Bell Telephone Laboratories, Incorporated, New York, N.Y., a corporation of New York
Filed May 2, 1960, Ser. No. 26,276
13 Claims. (Cl. 307—43)

This invention relates in general to electrical drive circuits and, more particularly, to transformer coupled drive circuits.

Numerous known devices have operating characteristics which require unique drive circuits to activate them. For instance, the activation of some solid state devices, such as PNPN diodes, requires the drive circuit to deliver a high activating voltage followed, in turn, by a low holding voltage to retain the device in its activated condition.

It is common practice, with load devices that require distinct activating and holding voltages, to deliver a voltage of sufficient magnitude to activate the load device and to employ a large resistor or other current limiting device to dissipate the excess power established upon activation of the load device while at the same time maintaining a low holding voltage. Such arrangements are unattractive as much power is wasted. Furthermore, the high power requirements exclude from use in the drive circuitry most fast acting solid state devices which are generally limited in their power handling capacity. The exclusion of these devices necessarily renders such drive circuits relatively slower acting and therefore incapable of meeting many present day high speed circuit requirements.

Another disadvantage associated with the prior art drive circuits is that, upon activation of the load device by impressing a high potential thereacross, high currents are established in the load device itself. These currents, if excessive, may damage the load or cause interference in the circuitry associated with the load device.

Accordingly then, it is a general object of this invention to provide an improved electrical drive circuit. More specifically, it is an object of this invention to provide an improved drive circuit which operates with small power dissipation and low valued peak currents.

It is a further object of this invention to provide a simple, rugged, and economical drive circuit capable of operating at high speeds.

These and other objects of my invention are attained in one specific illustrative embodiment wherein a drive circuit arrangement which is transformer coupled to the load automatically alters the turns ratio between the transformer windings so as to deliver distinct voltages necessary to fully activate the load device.

The drive circuit arrangement employs a primary winding of a transformer divided into a plurality of portions which are inductively coupled to the secondary or output winding. An initial predetermined voltage advantageously is established at the output winding by current build-up only through a first portion of the primary winding, which current is provided by activation of a switch device connected in series with the primary winding. This predetermined voltage is sufficient in magnitude to activate a load device connected across the output winding of the drive circuit.

Activation of the load device, in turn, reflects a signal from the output winding back to the first portion of the primary winding. This reflected signal lowers the potential established at a particular point in the drive circuit to allow a unilateral current conducting device to pass current through a series circuit formed by the first portion and a second portion of the primary winding. Current conduction through both the first and second portions of the primary winding thereby establishes a new turns ratio between the primary and secondary windings so as to induce a second predetermined voltage at the output terminals, which second voltage is sufficient to hold the load device in its activated condition. It is apparent that the portions of the primary winding, as well as the secondary winding, may advantageously have different numbers of turns so as to provide a wide variety of turns ratios between the two windings which would cause any desired predetermined voltages to be established at the secondary.

Thus my drive circuit, by automatically altering the turns ratio of the drive transformer, establishes distinct predetermined voltages at the output circuitry sufficient to fully activate the load device. This operation is accomplished without presenting high power and high peak current difficulties, while at the same time allowing complete freedom in the choice of solid state components to be employed in the drive circuit.

Accordingly, it is a feature of my invention that predetermined output voltages be established in a load circuit by automatically altering the turns ratio of a driving transformer.

It is another feature of my invention that the driving transformer turns ratio be altered by signals reflected from an activated load device.

It is yet another feature of my invention that a signal representative of impedance changes in a load device be utilized to activate a unilateral current conducting device which establishes a new turns ratio in the load driving transformer.

It is still another feature of my invention that distinct predetermined voltages, established by alteration of the turns ratio of the driving transformer, be utilized to activate a load device connected across the secondary of the driving transformer and subsequently to maintain the load device in the activated condition.

A complete understanding of these and other features of this invention may be gained from consideration of the following detailed description together with the accompanying drawing, in which:

FIG. 1 is a schematic arrangement of a transformer drive circuit in accordance with one specific illustrative embodiment of the invention; and FIG. 2 is a table of a representative number of turns and turns ratios of the transformer windings in accordance with the operation of the drive circuit of FIG. 1.

Turning now to FIG. 1, a schematic circuit of the drive circuit in accordance with my invention is shown. The circuit comprises a transformer 10 having a primary winding divided into two distinct portions 11 and 12 and a secondary winding 13 connected across a load device 15. Connected between potential source 20 and ground is a series circuit comprising the parallel combination of resistor 16 and capacitor 17, primary winding portion 11, and the collector-emitter path of transistor 18. A second series circuit comprising diode 21 and portion 12 of the primary winding is connected between potential source 14 and point 19 which is the common junction of primary portion 11 and the parallel combination formed by resistor 16 and capacitor 17.

The transistor 18 functions mainly in this circuit as a switch representing an open circuit when established in its high impedance state. When operation of the gate drive circuit is desired, an input pulse 22 of duration equal to the desired time of operation is applied to the base lead 23 of transistor 18, thereby causing conduction through the aforementioned series circuit between ground and potential source 20. When transistor 18 is biased into conduction by input pulse 22, the presence of capacitor 17, connected in shunt across resistor 16, essentially insures that the full voltage delivered by potential source 20 is established across primary portion 11. Primary portion 12 is not active in the circuit at this time since potential source 20 is larger than potential source 14, thus back biasing diode 21.

Reference to FIG. 2, which shows a table of illustrative values of turns ratio which might advantageously be utilized in the embodiment of my invention, discloses that primary portion 11 having N turns is magnetically coupled with secondary winding 13 having 3N turns. Thus, the drive circuit at this state of the operation is acting as a step-up transformer with turns ratio, as shown in FIG. 2, of one to three. This condition establishes across the load device 15 a voltage three times the magnitude of the voltage impressed initially across primary portion 11, the value of which will become apparent hereinafter.

Advantageously, a load device contemplated to be driven in accordance with the specific embodiment of my invention might be a semiconductor device having PNPN configurations as known in the art and disclosed, for example, in W. Shockley Patent 2,855,524, issued October 7, 1958. Such a device exhibits at least one high impedance junction to current flow in either direction through the device. This high impedance condition exists, however, only if the voltage established across the device remains below a first relatively high threshold value. When the impressed voltage exceeds this first threshold value, the high impedance state is overcome, and the device changes to a low impedance condition. The device will retain this low impedance condition only if a low voltage remains impressed across the device to maintain a small value of sustaining current present through the multijunctions of the device. Without the maintenance of this low holding voltage, the sustaining current is interrupted, and the device reverts to its high impedance value. This holding threshold is substantially below the first threshold value and near zero, thus adequately illustrating the impracticality of utilizing an initial breakdown voltage of a high magnitude to be maintained across the PNPN device causing a high current and resulting in excessive power dissipation which may cause destruction of the device when only a holding voltage of low magnitude is necessary.

Considering that a PNPN diode or other similar multistate impedance element is connected across the secondary of the instant drive circuit, the step-up transformer action previously mentioned delivers, at the secondary, a voltage sufficient in magnitude to exceed the first threshold value of the load device. This operation therefore drives the load device to a low impedance condition in accordance with above discussion.

The impedance change resulting from the step-up transformer action described hereinbefore produces a reflected signal in the form of a low impedance from transformer secondary winding 13 back to primary portion 11, which reflection allows capacitor 17 to charge very rapidly. This rapid charging, in turn, drops the voltage established at point 19 to an amount less in magnitude than the voltage at potential source 14. At this time diode 21 is biased into conduction, and current is supplied by potential source 14 through both primary portions 11 and 12 which are connected in series to ground through the collector-emitter path of transistor 18.

Reference again to FIG. 2 discloses that primary portion 12 has 4N turns which when added in series with portion 11 makes 5N the total number of turns on the primary side of transformer 10. Since both primary portions 11 and 12 are magnetically coupled to secondary 13, having 3N turns, the transformer turns ratio now established is five to three, or the gate drive circuit is acting as a step-down transformer.

The step-down transformer action thereby induces a low voltage in the secondary winding 13. This low voltage is sufficient in magnitude to maintain a small amount of sustaining current through the PNPN diode, which sustaining current thereby maintains the PNPN diode in a low impedance condition. The resistor 16 provides a means to discharge capacitor 17 so that the next input pulse 22 may reactivate the drive circuit in the manner described earlier.

It is readily apparent from the above description that the provision of a step-up and subsequently a step-down transformer to establish across the output load device a high activating voltage and a low holding voltage, respectively, provides a novel and efficient drive circuit with small peak currents and negligible power loss.

It is to be understood that the above-described arrangements are merely illustrative of the application of the principles of the invention. Numerous other arrangements may be devised by those skilled in the art without departing from the spirit and scope of the invention.

What is claimed is:

1. A circuit for driving a load device comprising a first winding having two distinct portions, a second winding connected to said load device and inductively coupled to said first winding, capacitive means connected to said first winding, means for controlling current flow through said capacitive means and one portion of said first winding to establish a predetermined voltage in said second winding, and means responsive to a charge established on said capacitive means by said current flow for establishing current flow through both portions of said first winding to induce a second predetermined voltage in said second winding.

2. A circuit for driving a load device in accordance with claim 1 wherein said two distinct portions each comprise a different number of turns.

3. A circuit for driving a multistate impedance element comprising a first winding defined by two distinct portions, a second winding connected to said multistate impedance element and inductively coupled to said first winding, a first potential source connected to one distinct portion of said first winding, means for inducing a predetermined voltage in said second winding comprising switch means for connecting said first potential source to ground through said one distinct portion of said first winding, a second potential source connected to the remaining portion of said first winding, and means for inducing a second predetermined voltage in said second winding comprising unidirectional current conducting means for connecting said second potential source to ground through both portions of said first winding.

4. A circuit for driving a load device comprising a primary winding having first and second portions, each of said first and second portions having a distinct number of turns, a secondary winding having a fixed number of turns connected to said load device and inductively coupled to said primary winding, means for controlling current flow through said first portion of said primary winding to establish a voltage in said secondary winding proportional to the turns ratio between said secondary winding and said first portion of said primary winding, capacitive means having a normal charging time connected to said first portion of said primary winding, said capacitive means being responsive to impedance changes in said load device for charging to a predetermined level at an increased charging rate, and means responsive to said predetermined charge level of said capacitor for inductively coupling said first and second portions of said primary winding to said secondary winding to establish a second predetermined turns ratio between said primary and secondary windings.

5. A circuit for driving a load device in accordance with claim 4 wherein said means responsive to said predetermined charge level of said capacitor includes a second potential source and a unilateral current conducting device connected in series with said second potential source and said second portion of said primary winding.

6. In combination, a transformer circuit for driving a load device, said transformer circuit comprising first and second windings, means including a capacitance connecting a first potential source to an intermediate terminal of said first winding, switch means, means for activating said switch means to connect one end of said first winding to ground to permit current flow from said first source through a portion of said first winding, said second winding being inductively coupled to said first winding and connected to a load device, means including a unilateral current device connecting the other end of said first winding to a second potential source, and means comprising said capacitance and said unilateral current device for establishing current flow from said second source through all of said first winding.

7. A drive circuit responsive to impedance changes in a load device and comprising a first winding having two distinct portions defined by end terminals and an intermediate terminal, a second winding inductively coupled to said first winding, means including a capacitive means connecting a first potential source to said intermediate terminal, switch means connected to one end terminal of said first winding, means for activating said switch means to establish current flow from said first potential source through the portion of said first winding between said intermediate and said one end terminal, and a second potential source connected to the other end terminal of said first winding, said capacitive means being responsive to impedance changes in said load device for charging at a rate higher than its normal charging rate to establish current flow through both portions of said first winding.

8. In combination, a transformer comprising a first winding having two portions defined by an intermediate terminal, means including a capacitance connecting a first potential source to said intermediate terminal, switch means connected to one end terminal of said first winding, means including a normally nonconducting unilateral current device connected between a second potential source and the other end terminal of said first winding, a second winding inductively coupled to said first winding, means for activating said switch means to establish a predetermined voltage in said second winding, load means connected to said second winding responsive to said predetermined voltage for establishing signal reflections in said first winding, and means including said capacitance and said unilateral current device for establishing a second predetermined voltage in said second winding.

9. In combination, a transformer drive circuit for a load device, said drive circuit comprising a first winding having two portions defined by end terminals and an intermediate terminal, a first potential source, resistive means connecting said first potential source to said intermediate terminal, switch means connected between one of said end terminals and ground, a second winding connected to said load device and inductively coupled to said first winding, means comprising switch activating means for controlling current flow from said first potential source through one portion of said first winding to establish a predetemined voltage in said second winding, a second potential source, a diode poled to be normally nonconducting connected between said second potential source and the remaining end terminal of said first winding, said load device being responsive to said predetermined voltage to cause signal reflections in said first winding, and capacitive means in parallel with said resistive means for being charged at a first rate to a sufficient voltage to bias said diode into conduction, said capacitive means being responsive to said signal reflections from said load device for being charged to said biasing voltage at a rate faster than said first rate whereby said predetermined voltage in said second winding is altered.

10. In combination, a transformer circuit for driving a multistate impedance element, said transformer circuit comprising a first winding having two portions defined by end terminals and an intermediate terminal, each of said portions having a distinct number of turns, a first potential source, resistive means connecting said first potential source to said intermediate terminal, switch means for connecting one end terminal of said first winding to ground, a second winding having a fixed number of turns connected to said load device and inductively coupled to said first winding, means for activating said switch means to establish a predetermined turns ratio between said one portion and said secondary winding, said predetermined turns ratio establishing a voltage across said secondary winding sufficient to activate said load device, a second potential source, a diode poled to be normally nonconducting connected between said second potential source and the remaining end terminal of said first winding, and means including capacitance means connected in parallel with said resistive means for biasing said diode into conduction to establish a second predetermined turns ratio between said primary and said secondary windings, said second predetermined turns ratio establishing a voltage across said secondary winding sufficient to maintain said load device in an activated condition.

11. A circuit for driving a load device comprising a primary winding having first and second portions having their inner ends connected to an intermediate terminal, a secondary winding connected to said load device and inductively coupled to said primary winding, a first potential source, a resistor and a capacitor connected in parallel between said first potential source and said intermediate terminal, a second potential source, a diode connected in series with said second potential source and the outer end of said first winding portion, and switch means connected between a common ground and the outer end of said second winding portion.

12. A driving circuit in accordance with claim 11 wherein said first potential source is larger than said second potential source and said diode is poled in a direction to be normally nonconducting.

13. A pulse generator circuit comprising a transformer having a secondary winding and a tapped primary winding, a first potential source, a capacitor connected between said first potential source and a tap on said primary, a second potential source, a diode interconnecting said second potential source with one end of said primary, and switch means for connecting the other end of said primary to a common ground.

References Cited in the file of this patent
UNITED STATES PATENTS
1,343,203   Eschholz   June 15, 1920